(12) United States Patent
Anderson et al.

(10) Patent No.: US 8,548,488 B2
(45) Date of Patent: Oct. 1, 2013

(54) AUTOMATED CONFIGURATION OF A WIRELESS LOCATION SYSTEM

(75) Inventors: Robert J. Anderson, Phoenixville, PA (US); Rashidus S. Mia, Phoenixville, PA (US); Robert Binion, II, Collegeville, PA (US); Benjamin H. Cohen, Malvern, PA (US)

(73) Assignee: TruePosition, Inc., Berwyn, PA (US)

( * ) Notice: Subject to any disclaimer, the term of this patent is extended or adjusted under 35 U.S.C. 154(b) by 1364 days.

(21) Appl. No.: 11/948,244

(22) Filed: Nov. 30, 2007

(65) Prior Publication Data

US 2009/0143018 A1 Jun. 4, 2009

(51) Int. Cl.
*H04W 24/00* (2009.01)

(52) U.S. Cl.
USPC ..................... 455/456.1; 455/456.5

(58) Field of Classification Search
USPC ........................... 455/456.1, 456.5
See application file for complete search history.

(56) References Cited

U.S. PATENT DOCUMENTS

| | | | |
|---|---|---|---|
| 6,317,604 B1 | 11/2001 | Kovach, Jr. et al. | |
| 6,351,235 B1 | 2/2002 | Stilp | 342/357.06 |
| 6,400,320 B1 | 6/2002 | Stilp et al. | 342/457 |
| 6,483,460 B2 | 11/2002 | Stilp et al. | 342/457 |
| 6,738,625 B1 * | 5/2004 | Oom et al. | 455/453 |
| 6,937,877 B2 | 8/2005 | Davenport | |
| 7,064,619 B1 * | 6/2006 | Meyer et al. | 331/44 |
| 7,302,269 B1 | 11/2007 | Crawford et al. | |
| 7,383,049 B2 | 6/2008 | Deloach | |
| 2002/0039904 A1 * | 4/2002 | Anderson | 455/456 |
| 2002/0082044 A1 * | 6/2002 | Davenport | 455/552 |
| 2003/0125046 A1 | 7/2003 | Riley et al. | |
| 2005/0215269 A1 | 9/2005 | Cheok et al. | |
| 2007/0077945 A1 * | 4/2007 | Sheynblat | 455/456.5 |
| 2007/0161385 A1 | 7/2007 | Anderson | |
| 2007/0240231 A1 * | 10/2007 | Haswarey et al. | 726/28 |
| 2007/0270168 A1 | 11/2007 | Sheynblat | |
| 2008/0085699 A1 * | 4/2008 | Hirano et al. | 455/414.2 |

OTHER PUBLICATIONS

United States Patent and Trademark Office: U.S. Appl. No. 11/534,137, filed Sep. 21, 2006, 44 pages.
United States Patent and Trademark Office: U.S. Appl. No. 11/736,902, filed Apr. 18, 2007, 38 pages.
European Patent Application No. 08855217: Search Report dated Mar. 22, 2011, 7 pages.
International Search Report, dated Jan. 15, 2009, 15 pages.

* cited by examiner

*Primary Examiner* — Vladimir Magloire
*Assistant Examiner* — Edd Rianne Plata
(74) *Attorney, Agent, or Firm* — Woodcock Washburn LLP (57) ABSTRACT

In an overlay, network-based Wireless Location System, Location Measurement Units (LMUs) are used to collect radio signaling both in the forward and reverse channels for use in TDOA and/or AoA positioning methods. Information broadcast from the radio network and by global satellite navigation system constellations can be received by the LMUs and used to reduce the difficulty of initial system configuration and reconfiguration due to radio network changes.

25 Claims, 7 Drawing Sheets

AUTOMATED CONFIGURATION OF A WIRELESS LOCATION SYSTEM

TECHNICAL FIELD

The present disclosure relates generally to methods and apparatus for locating wireless devices, also called mobile stations (MS), such as those used in analog or digital cellular systems, personal communications systems (PCS), enhanced specialized mobile radios (ESMRs), and other types of wireless communications systems. More particularly, but not exclusively, the present disclosure relates to a method for use in automatically providing configuration data in a wireless location system (WLS). Such a method can reduce the cost and complexity of deploying and maintaining a WLS. In addition, the present disclosure relates to methods and systems that improve the operational efficiency of a WLS, e.g., by maintaining a database containing configuration data as well as historical data identifying the location measurement units (LMUs) as well as the location technology that were utilized in locating a MS in a specific cell or sector.

BACKGROUND

In an uplink time difference of arrival (U-TDOA) location system (and other location systems), location performance is normally expressed as one or more circular error probabilities. The United States Federal Communications Commission (FCC) as part of the Enhanced 9-1-1 Phase II mandate requires that network-based systems, such as U-TDOA systems, be deployed to yield a precision that generates a one-hundred meter (100 m or 328.1 feet) accuracy for 67% of emergency services callers and a three-hundred meter (300 m or 984.25 feet) accuracy for 95% of emergency services callers. Overlay network-based wireless location systems have been widely deployed in support of location-based services including emergency services location. The installation and tuning of such systems can require manual entry of myriad configuration parameters derived from operator supplied data, manual site surveys and measurements, topographical and geographical analysis and simulations. The system information, geographic information, cabling details and radio settings that can be collected during the planning and installation phases of deployment are shown below in Tables 1 and 2.

Table 1 identifies top-level information on the wireless communications system and all individual Base Stations, Node-B or Access point sites. The information requested in each field should be provided by the wireless network provider or operator for every Base Station, Node-B or Access Point site in the to-be deployed market. Once collected, this information forms the basis of the Serving Mobile Location Center (SMLC) database as well as part of the accuracy prediction modeling. In the tables below, references to TruePosition refer to the assignee of the present application, TruePosition, Inc.

TABLE 1

System and Base Station Site Data

| Database Column | Comment | Data Entered |
| --- | --- | --- |
| System ID (MCC + MNC) | System ID for the switch that is hosting this Base Station/Node B or AP site. (SS7 Identifier) | Numerical Value |
| System Identifier | The System Identifier field is eight octets in length, and contains the identifier of the system (TCP/IP Identifier) note: An SS7 identifier or a TCP/IP address is required. | Numerical Value (if available) |
| Base Station ID | The alphanumeric BCFID that identifies the Base Station cell site. | Alphanumeric Text |
| RF Band | Indicates what band this Base Station site is using. 0 = 850 MHz, 1 = 1900 MHz, 2 = 900 MHz, 3 = 1800 MHz, 4 = 2100 MHz, 5 = 700 MHz, 6 = 450 MHz | Numerical Values |
| BSC ID | Alphanumeric Base Station Controller ID assigned by the Wireless Operator to identify the Base Station Controller (GSM only) | Alphanumeric Text |
| RNC-ID | Radio Network Controller Identifier (UMTS only) | Alphanumeric Text |
| MSC ID | The Mobile Switching Center ID that consists of a 1 to 3 digit E.164 Country Code (CC), a 3 digit NDC, and a variable number (also known to the Wireless Operator as Mobile Switching Center ISDN). | Alphanumeric Text |
| Cell Site Latitude | WGS-84 Latitude of the Base Station site antennas, in decimal degrees format with a resolution of $10^{-6}$ degrees. (dd.dddddd) | Numerical Values |
| Cell Site Longitude | WGS-84 Longitude of the Base Station site antennas, in decimal degrees format with a resolution of $10^{-6}$ degrees (ddd.dddddd) | Numerical Values |
| GPS AGL | Height above ground level, in meters, of the Global Positioning System antenna. If no Global Positioning System (GPS) antenna is currently installed, insert zero (0). | Numerical Value |
| LMU Site Antenna Description | Enter the type of site: 1 = tower, 2 = monopole, 3 = Remote antennae, 4 = Distributed Antenna site | Numerical Value |

Table 2 identifies an entry for each cell or sector in each base station site identified in the market. If multiple sectors are used at a site, data should be provided, as a separate record, for each sector. If multiple air interface technologies are used at a site, data should be provided, as a separate record, for each air interface and each sector using that technology. Table 2 is presented here with the assumption of 3-sectors per cell site or less. Additional sectors will result in additional columns.

TABLE 2

Base Station Site Sector Data

| Database Column | Comment | ALPHA | BETA | GAMMA |
| --- | --- | --- | --- | --- |
| Sector ID | Sector identifier. 1 - Alpha, 2 - Beta, 3 - Gamma. For omni-directional sites, this should always be 1. | Numerical Value | Numerical Value | Numerical Value |
| Sector Active | Indicates if the sector is currently active within the system. 0 = No; 1 = Yes | Numerical Value | Numerical Value | Numerical Value |
| Antenna Type | Identifier of the antenna type. Set to zero (0) if this is an omni antenna, set to one (1) if a sectorized antenna. | Numerical Value | Numerical Value | Numerical Value |
| Antenna Gain | Antenna gain in dB. Decimal format with a resolution of $10^{-2}$. (dBi format) | Numerical Value in dBi | Numerical Value in dBi | Numerical Value in dBi |
| Antenna Azimuth | Azimuth in degrees | Numerical Value in degrees | Numerical Value in degrees | Numerical Value in degrees |
| Antenna Tilt | Depression angle in degrees. Negative value denotes antenna uptilt. (Combined electrical and mechanical) | Numerical Value in degrees | Numerical Value in degrees | Numerical Value in degrees |
| Antenna Latitude | WGS-84 Latitude in decimal format with a resolution of $10^{-6}$ degrees (dd.dddddd) | Numerical Value | Numerical Value | Numerical Value |
| Antenna Longitude | WGS-84 Longitude in decimal format with a resolution of $10^{-6}$ degrees (ddd.dddddd) | Numerical Value | Numerical Value | Numerical Value |
| Antenna above Mean Sea Level | Height of ground above Mean Sea Level of structure antennas are mounted to (e.g., tower, building, etc.), in meters | Numerical Value | Numerical Value | Numerical Value |
| Antenna AGL | Height of antenna relative to antennaAmsl, in meters | Numerical Value | Numerical Value | Numerical Value |
| Horizontal Beamwidth | Horizontal beamwidth of the receive antenna with a resolution of 0.1 degrees | Numerical Value in degrees | Numerical Value in degrees | Numerical Value in degrees |
| Vertical Beamwidth | Vertical beamwidth of the receive antenna with a resolution of 0.1 degrees | Numerical Value in degrees | Numerical Value in degrees | Numerical Value in degrees |
| Indoor Coverage | Indicate whether the sector provides only indoor coverage 0 = No; 1 = Yes | Numerical Value | Numerical Value | Numerical Value |
| Multicoupler Gain | Multicoupler gain in dB. Decimal format with a resolution of $10^{-2}$ | Numerical Value (in Db) | Numerical Value (in Db) | Numerical Value (in Db) |
| Cable Length | Radio frequency cable length in meters - Jumper 0 Dx1/Dx2 | Numerical Value | Numerical Value | Numerical Value |
| | Radio frequency cable length in meters - Feeder Dx1/Dx2 | Numerical Value | Numerical Value | Numerical Value |
| | Radio frequency cable length in meters - Jumper 1 Dx1/Dx2 | Numerical Value | Numerical Value | Numerical Value |
| | Radio frequency cable length in meters - Jumper 0 Tx3 | Numerical Value | Numerical Value | Numerical Value |
| | Radio frequency cable length in meters - Feeder Tx3 | Numerical Value | Numerical Value | Numerical Value |
| | Radio frequency cable length in meters - Jumper 1 Tx3 | Numerical Value | Numerical Value | Numerical Value |
| MCC | The mobile country code (MCC) identifies the country in which the GSM PLMN is located. The value of the MCC is a 3-digit number assigned according to E.214 numbering plan. (GSM only) | Numerical Value | Numerical Value | Numerical Value |
| MNC | The mobile network code is a code identifying the GSM PLMN in that country (GSM only) | Numerical Value | Numerical Value | Numerical Value |
| LAC | The Location Area Code is a fixed length code (of 2 octets) | Numerical Value | Numerical Value | Numerical Value |

TABLE 2-continued

Base Station Site Sector Data

| Database Column | Comment | ALPHA | BETA | GAMMA |
|---|---|---|---|---|
| | identifying a location area within a GSM PLMN. (GSM only) | | | |
| RAC | The Routing Area Identifier Code is a fixed length of 1 octet and identifies a routing area within a location area (GPRS and UMTS) | Numerical Value | Numerical Value | Numerical Value |
| SAC | Service Area Code - A 2 octet element used to uniquely identify an area consisting of one or more cells belonging to the same Location Area (UMTS only) | Numerical Value | Numerical Value | Numerical Value |
| CGI | The Cell Global Identity is the concatenation of the LAI (Location Area Identity) and the CI (Cell Identity) and uniquely identifies a given cell | Numerical Value | Numerical Value | Numerical Value |
| Cell Identifier | The Cell Identifier is a 2 octet long hexadecimal identifier that identifies a cell within a location area. (GSM only) | Numerical Value | Numerical Value | Numerical Value |
| CI | The cell identity is a 16 bit identifier in GSM and UMTS. When combined with the LAI (Location Area Identity) or RAI (Routing Area Identity) the result is termed the CGI (Cell Global Identity). | Numerical Value | Numerical Value | Numerical Value |

Over the years, the terminology used to describe wireless location technology has evolved. The uplink radio receiver system, originally called the Signal Collection System (SCS), is now sometimes referenced using the 3GPP-defined terms Location Measurement Unit (LMU) and Position Determining Entity (PDE), standardized by the Telecommunications Industry Association (TIA) and later 3GPP2. Similarly, terms used to describe wireless communications networks vary with the AMPS/TDMA/CDMA term "Cell Sector" equivalent to the GSM term "Cell Global Identifier" (CGI), the UMTS term Cell Identity (CI) and the IEEE terms "Access Point" (AP) or Base Station (BS). Certain wireless communications network terms are used interchangeably depending on whether they refer to the usage (e.g. "Beacon"), the standardized term (e.g. "BCCH") or the identifier associated with the antenna (e.g. CGI).

Moreover, given the rapid change in the types of wireless communications systems (cellular, SMR, unlicensed band and mobile-network-virtual-operators (MVNOs) the term "operator" and "carrier" are herein described as the generic term, "wireless network provider" or WNP. Even TruePosition's TDOA and AoA core high accuracy location product naming has changed in the last decade from the "Wireless Location System" (WLS) to "Location Network" and now to "TruePosition Location Platform" (TLP).

The inventive techniques and concepts described herein apply to time and frequency division multiplexed (TDMA/FDMA) radio communications systems including the widely used IS-136 (TDMA), GSM, and OFDM wireless systems, as well as code-division radio communications systems such as CDMA (IS-95, IS-2000) and Universal Mobile Telecommunications System (UTMS), the latter of which is also known as W-CDMA. The Global System for Mobile Communications (GSM) model discussed below is an exemplary but not exclusive environment in which the present invention may be used.

SUMMARY

The following summary provides an overview of various aspects of exemplary implementations of the invention. This summary is not intended to provide an exhaustive description of all of the important aspects of the invention, or to define the scope of the invention. Rather, this summary is intended to serve as an introduction to the following description of illustrative embodiments.

As discussed more fully below, the embodiments described herein are configured to employ downlink receiver and GPS systems of a WLS to reduce the errors and effort attendant to compilation of configuration data collected from the operator's network and global navigation satellite systems as well as the self-discovery of communications link support. This can in turn yield lower cost of deployment and operation for the WLS operator. Automated configuration and reconfiguration make use of subsystems already developed and deployed in U-TDOA, AoA, or in hybrid U-TDOA/AoA, U-TDOD/A-GPS or U-TDOA/AoA/A-GPS hybrid wireless location systems. In sum, a goal of automated configuration of a WLS is to lower the cost of system deployment. The same capabilities used to lower deployment costs may also be used to automate and thus lower the cost of reconfiguration of the WLS whenever the underlying operator radio system is reconfigured.

The LMU (formerly called the SCS) possesses three subsystems allowing for collection of data used in the automation process. The overlay LMU is typically co-located with the radio communications network's transceivers and re-uses the existing radio front end, saving on the cost of antennas, cabling, amplifiers and filters. The LMU can be sited in a standalone fashion if deployed with a radio front-end. The LMU may also be incorporated into the wireless network's base station as a dedicated or shared receiver and processing unit.

The LMU possesses a GPS receiver subsystem used for determination of a common time reference by the geographically dispersed U-TDOA and AoA LMU receivers. In this inventive embodiment, the GPS receiver subsystem will not only determine time, but also provide the automation application with the precise position of the GPS antenna. Since the LMU installation, and most importantly the LMU's uplink (mobile device-to-LMU) receive antenna is proximate to the GPS antenna, manually entered coordinates of the LMU and receive antenna can be verified by the automation application. This GPS antenna may be shared with the hosting base station if GPS timing is also used by the base station.

To meet the multiple communications backhaul (between the BTS and central office) options, the LMU may be configured with a communications subsystem with multiple output ports. These ports may include a T1/E1 switched circuit data port, an Ethernet (IEEE 802.11) asynchronous packet data port, and a V.35 synchronous serial modem port. These ports may be connected to external converters or switching hardware to interface into a further variety of wired or wireless backhaul options. The automation application may be configured to automatically detect the port in use as well as transmission characteristics, which enables the system to automate configuration of the LMU-SMLC backhaul connection.

In a network-based WLS, the LMU is deployed with a downlink antenna subsystem to enable downlink beacon discovery. See U.S. application Ser. No. 11/736,902, filed Apr. 18, 2007, "Sparsed U-TDOA Wireless Location Networks," which is hereby incorporated by reference in its entirety. For the automated configuration embodiments, as beacons are discovered, the WLS can be configured for:

1. demodulating the AP-ID, CGI, cell/sector ID, CID or CI out of the beacon;
2. determining the approximate geographic location of the beacon origination points, using Downlink TDOA (i.e., time difference of arrival computation using the downlink receiver subsystem to provide the signal-of-interest to the LMU); and
3. produce an internal mapping of CGIs to the pre-configured cell tower locations.

This technique can eliminate the need for wireless network providers to provide, and keep current, the complete wireless network AP-ID, CGI, cell/sector ID, CID or CI mappings in the WLS configuration data.

In addition, the present disclosure relates to methods that improve the operational efficiency of a WLS. For example, the WLS can include an SMLC database containing configuration data as well as historical data identifying the LMUs as well as the location technology that were utilized in locating a MS in a specific cell or sector. Such historical information can be used to efficiently identify the specific LMUs and location technology to use in handling new location requests. Moreover, the operation of a WLS may be improved by recording the results from wireless location calculations for multiple location technologies for location attempts within a specific cell or sector and then using this historical database to select the optimal technology that best suits the required quality of service for future location requests for that specific cell or sector.

Other aspects of the present invention are described below.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

We will now describe illustrative embodiments of the present invention. First, we provide a detailed overview of the problems and components involved and then we provide a detailed description of our solutions.

Overview

From time to time, Wireless Network Providers (WPNs) perform acts that can affect the proper configuration of an associated WLS. For example, network operators may install new cell sites, decommission old cell sites, install new antennas, add new sectors, reset timing clocks, re-allocate radio frequencies and adjust channel allocations within the wireless communications system. The WLS, which may be a hybrid system using known location techniques such as cell-ID, Enhanced Cell-ID, U-TDOA, AoA, control plane A-GPS, and user plane A-GPS, is used within the carrier network either as an overlay or actively integrated into the wireless operator/carrier's network. The WLS may require extensive provisioning of network and radio parameters to function correctly. These parameters were originally manually entered items obtained by site and system surveys. Later, these parameters were obtained from the wireless network provider's Operations Support System (OSS). The OSS system is used by the wireless provider's network (WPN) for maintaining network inventory, provisioning services, configuring network components, and managing faults within the wireless communications network. However, due to the uniqueness of the WLS, the OSS may not be able to provide all required parameters and manual entry as well as on-site surveys may still be required to provision the WLS.

In accordance with an aspect of the present disclosure, the WLS uses receiver and transceiver subsystems already used for other purposes within the WLS to either verify or automatically provision specific network and radio parameters. The formerly static configuration files maintained on the SMLC are replaced by a dynamic database in which detected network settings, radio parameters and location records are maintained. After the initial verification or provisioning of the WLS is complete, the same receiver and transceiver subsystems are used to monitor the WCS for changes to the radio and network parameters.

In accordance with another aspect of the present disclosure, both configuration data and historical location records are maintained by the WLS in a central, interactive SMLC database. In addition, the SMLC includes a configuration application (software) and an expert system for location tasking. In this example, the SMLC processor is configured, via the expert system application, to record LMU use during a location event for mobile stations in a specific cell or sector and then to use only those LMUs that produced useful information in subsequent locations for mobile stations within that specific cell or sector. Moreover, the SMLC processor is further configured to record a historical database of results from location calculations involving multiple location technologies for MSs within a specific cell or sector, and then to use the historical database to select the technology or combination of technologies that best suits a requested quality of service for future location requests for MSs within that specific cell or sector.

Figure 1:
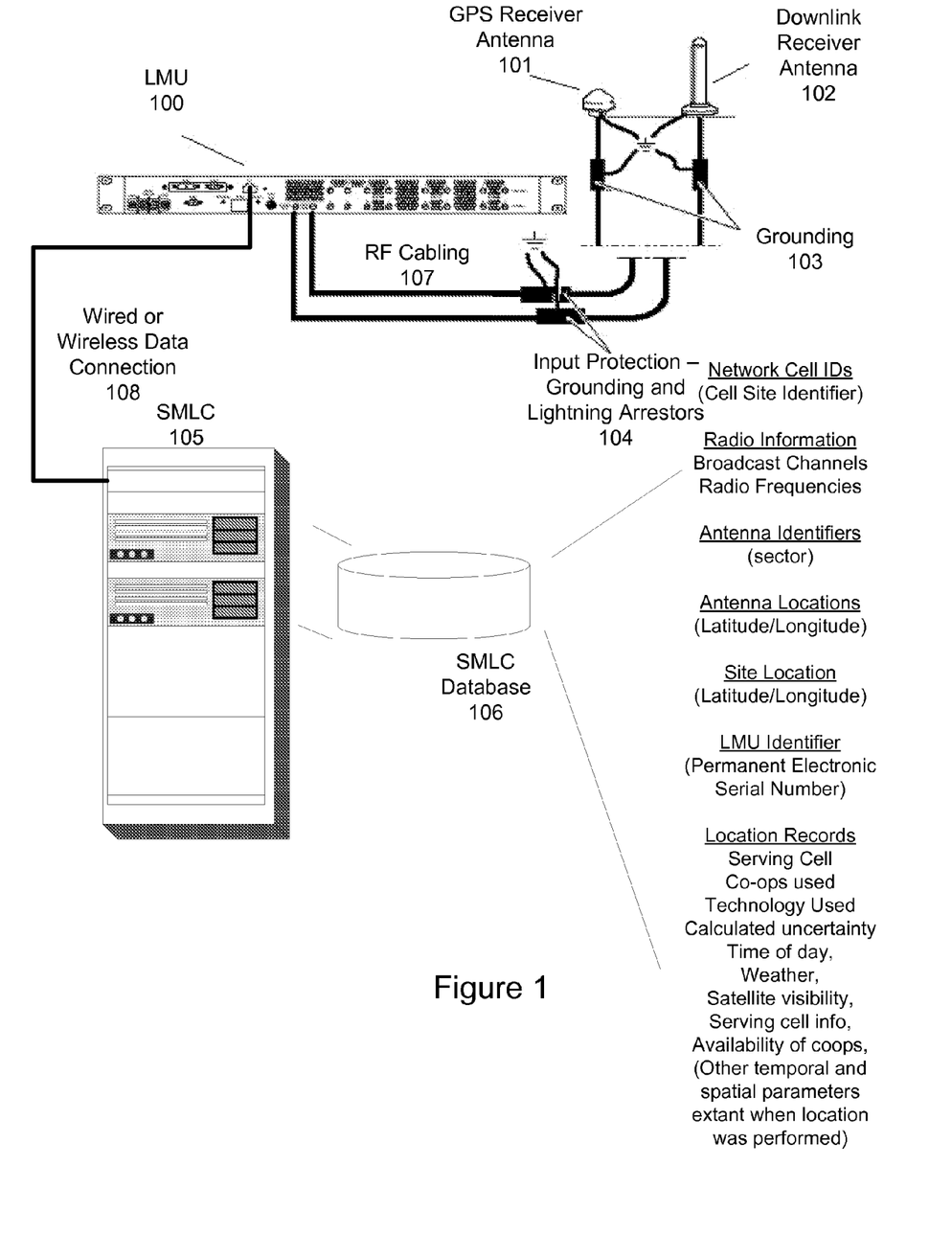
FIG. 1 depicts certain subsystems of a Wireless Location System.

FIG. 1 schematically depicts an exemplary deployment of an overlay WLS comprising an LMU 100; GPS receiver antenna 101; downlink receiver antenna 102; grounding 103 and input protection 104 needed to safely interface the LMU 100 to the exterior mounted antennae 101, 102; SMLC 105 and SMLC database 106; and radio frequency cabling 107. As shown, the LMU 100 is connected to the SMLC 105 via a wired or wireless connection 108, which carries TCP/IP packet-based communications. The SMLC 105 hosts the SMLC Database 106, which contains the network cell identifiers, network antenna identifiers, network antenna locations, LMU (cell) locations, and LMU identifiers.

Figure 2:
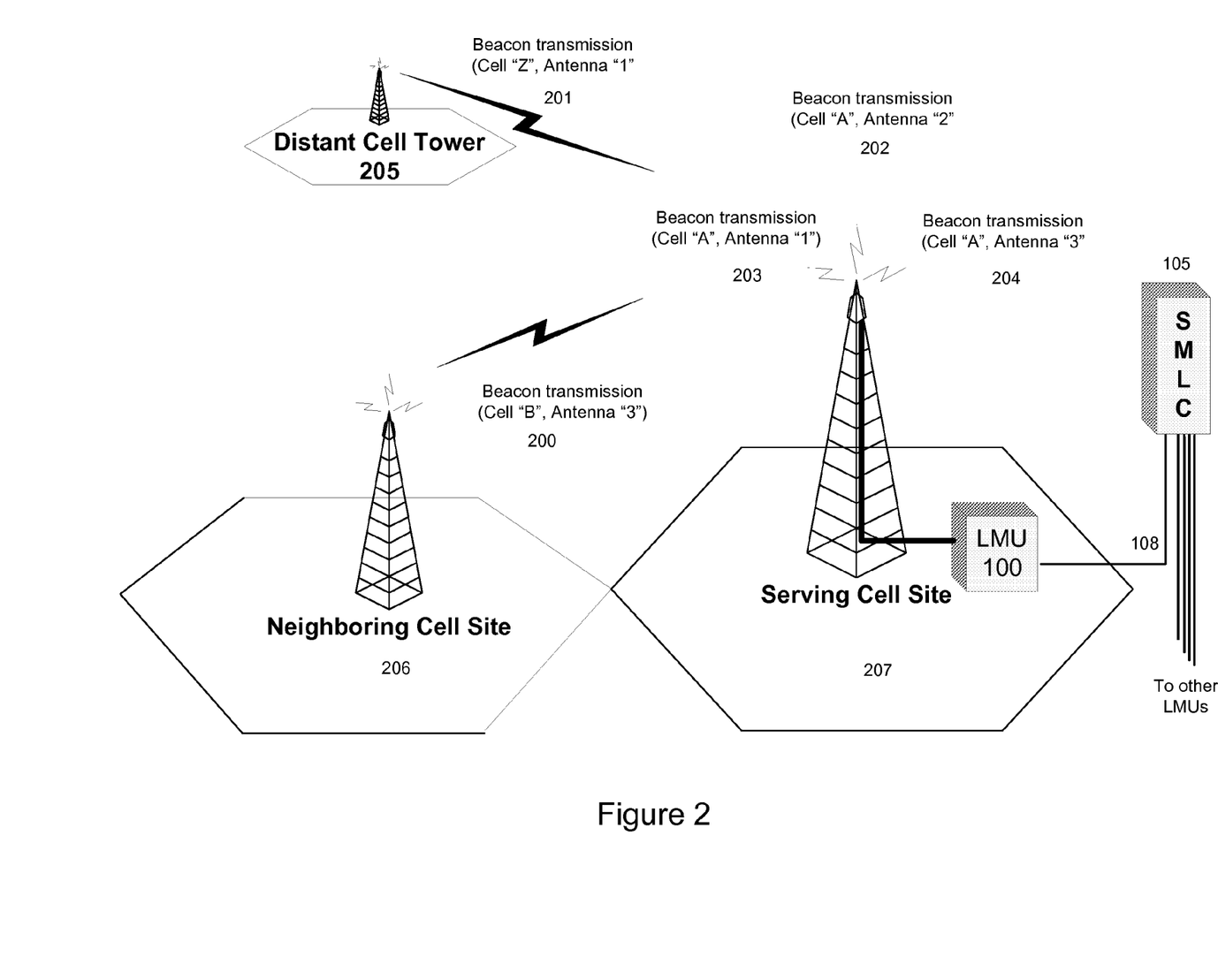
FIG. 2 illustrates the collection of terrestrial radio information from a wireless communications network.

FIG. 2 depicts the manner in which terrestrial radio information from a wireless communications network may be collected by the LMU 100. As shown, broadcast information 200, 201, 202, 203, 204 from cell sites 205, 206, 207 (or access points) is provided to the SMLC 105 via the LMU's 100 downlink receiver subsystem. This broadcast information can be obtained from the broadcast or "beacon" transmissions of the cell sites. In this example, the beacons are received by LMU 100 using the LMU's downlink receiver subsystem.

Figure 3:
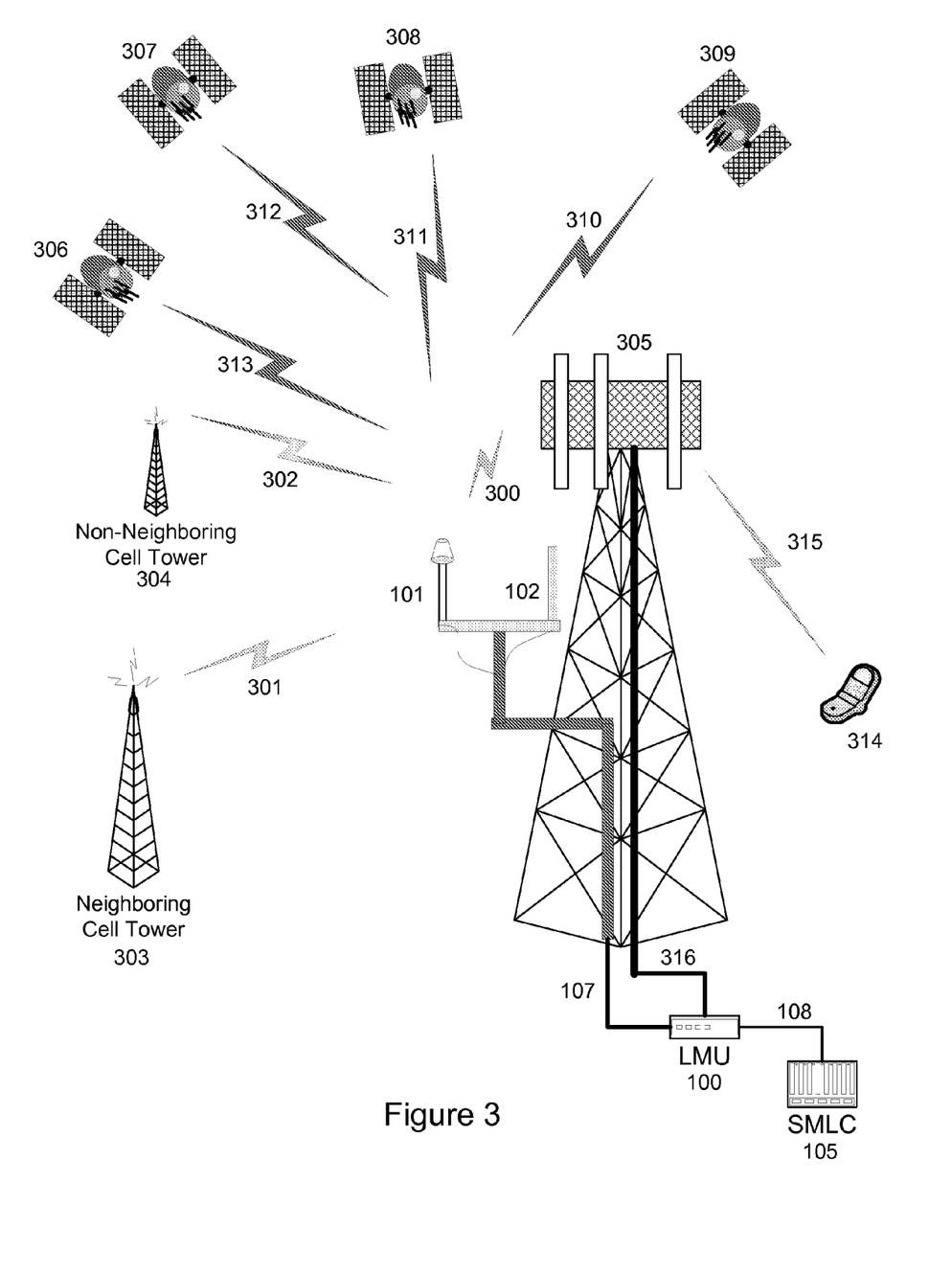
FIG. 3 illustrates the collection of broadcast terrestrial and satellite information from a mobile device, wireless communications network and the GNSS constellation.

FIG. 3 shows broadcast signals or beacons 300, 301, 302 generated by the wireless communications network sites 303, 304, 305 available to the LMU 100 via the downlink receiver antenna 102, as well as a satellite constellation 306, 307, 308, 309, generated broadcast signals 310, 311, 312, 313, available to the LMU 100 via the GPS receiver antenna 101. FIG. 3 also shows the radio signal 315 generated on the reverse control channel or reverse traffic channel (as defined by the radio communications protocol used) by a mobile device 314, in this case a wireless telephone. As shown, the LMU 100 is connected to the downlink receiver antenna 102 and GPS receiver antenna 101 by radio frequency grade cabling 107 and connected to the wireless communications system antenna 305 by separate radio frequency grade cabling 316. The LMU is in turn connected to the SMLC 105 by a wired or wireless packet data connection 108. Although not shown in FIG. 3, WLS antennae and LMUs may be installed at neighboring antenna sites 303 and non-neighboring antenna sites 304.

The receiver and transceiver subsystems used by the WLS—including the GPS receiver, backhaul communications and downlink receiver subsystems—and the dynamic SMLC database are described in greater detail below.

GPS Receiver Subsystem

The GPS receiver subsystem shown in FIG. 3 relies on transmissions from global satellite constellations (in this example, the United States Air Force NAVSTAR system) to calculate the precise time-of-day and the receiver's location. Further details about this can be found in U.S. Pat. No. 6,351, 235, "Method and System for Synchronizing Receiver Systems of A Wireless Location System," Feb. 26, 2002, although the reference signals are produced with less than 0.001 degrees RMS of phase noise when integrated from 10 Hz to 15 kHz.

On initial activation, the GPS receiver will self-locate. Once the LMU has discovered and initialized communications with the SMLC, an automated configuration application will communicate the GPS produced location to the SMLC. The SMLC will check this discovered location versus any manually input LMU location data for the LMU site. If manually entered LMU location data exists for the LMU site, then the SMLC will compute the distance between the entered and calculated LMU locations. If the manually entered LMU location differs from the GPS calculated position, then an error is indicated. This error condition may provoke the SMLC to automatically replace the manually entered LMU location with the GPS calculated position or cause an error message requesting manual intervention.

The automatic replacement of erroneous LMU location data may be predicated by the site definition. If an LMU site is defined as a tower or monopole site, then the distance between the GPS antenna and the LMU receiver antenna can be assumed to be minimal and reliance on the GPS antenna self-discovered position not impacting to the calculated location.

GPS timing receivers typically operate in a fixed position mode to provide the highest timing accuracy. GPS timing receivers, such as those used by the WLS, are capable of self-determining location as well as providing timing. In order to improve the accuracy of the manually or OSS entered fixed position, the GPS timing receiver can perform an operation called "GPS Self Survey". In this operation, the GPS receiver subsystem self-determines an accurate position (latitude, longitude and altitude) using conventional GPS TDOA techniques. Moreover, GPS timing receivers are designed to support holdover timing to continue to provide accurate timing even during times when the GPS constellation is blocked. (For example, most GPS-based timing devices include a holdover oscillator that operates in parallel to the GPS system. These holdover oscillators may not be as accurate as the atomic clocks on the GPS satellites and thus may require periodic "tuning" so that the frequency of the holdover oscillator matches the frequency of the atomic clocks in the GPS satellites.) The self-survey operation takes advantage of the holdover capability to provide a background GPS Self Survey—i.e., the GPS receiver subsystem is able to deliver an accurate time signal to the LMU during the holdover period while the GPS receiver self-determines position for verification of entered location data.

For initial GPS receive antenna location, once the timing receiver has reached a mode of operation where holdover can be effectively used, the timing receiver can be placed in a commanded holdover mode for a limited period of time to perform a short self survey. Multiple short self surveys can be performed and averaged together to improve the accuracy of the known position. The distribution of each short self survey is such as to maximize the overall view of the constellation in the total averaged self survey result. The standard deviation of the self survey data provides a confidence factor of the accuracy of the surveyed position. An example would be to place the GPS receiver into holdover for 15-minute time periods multiple times over one or more days and calculate an average and standard deviation of these survey results to provide a location and confidence factor on that location while continuing to provide accurate location throughout. During this process, the calculated position can be delivered to the SMLC for verification or replacement of the entered data.

Backhaul Communications Subsystem/Automated LMU Configuration

The LMU supports a backhaul communications subsystem for rapid interconnection to existing base stations without the need for signal or protocol conversion. In this example, regardless of whether the communications link is circuit switched or packet based, the LMU uses TCP/IP over the provided transport for communications with the SMLC. On initialization, the LMU can discover its backhaul and establish communications with the SMLC automatically.

Techniques can be used to minimize the manual configuration required to physically connect (backhaul) an LMU to a WLS. An exemplary technique is useful both for new installations as well as "backhaul re-home" scenarios. For re-home scenarios, this technique can be used to minimize configuration synchronization problems, wherein an LMU is physically moved before an updated configuration has been completed, or visa versa. This technique can be applied regardless of the physical backhaul connecting a WLS to an LMU, be it T1/E1, IP, ATM, Ethernet, or any other conventional or non-conventional physical interconnect.

A newly connected, reconnected, reset (or other form of interrupted service) LMU will probe for a WLS by sending a short identification beacon repeatedly across all physical connections. The identification beacon effectively identifies that an LMU is seeking to connect itself to a WLS. The WLS can be pre-configured with a list of LMUs, the identities of the listed LMUs, as well as a surveyed geographic location of each LMU. Upon receiving an identification beacon, the "Wireless Location System-LMU Access Point" (WLS-LAP) will initiate a protocol negotiation over the physical interface that carried the identification beacon. A minimum (factory installed) protocol version will be selected, allowing an un-configured LMU to still negotiate with the WLS-LAP. After the LMU has been accepted by the WLS-LAP, a higher protocol version can be re-negotiated as supported by the LMU and the WLS-LAP.

Upon completing negotiation, the LMU will provide its auto-discovered geographic position (Lat, Lon) to the WLS-LAP. The LMU can auto-discover its geographic position through use of, but not limited to, an onboard GPS receiver, as described above. The WLS-LAP will interrogate the configured list of LMUs and select the entry having a geographic position nearest the position reported by the "beaconing" LMU. The WLS-LAP will then provide the LMU with the LMU's configured identity, so that the LMU can identify itself to the rest of the WLS.

In the event that a match is not identified by the WLS-LAP, the LMU will continue to probe across its remaining physical connections until a WLS-LAP is found which will claim "ownership" for the "beaconing" LMU. It will also, periodically revisit any physical connections for which a WLS-LAP had previously been discovered.

A variation of the technique described above can be accomplished by having the WLS-LAP perform the "identification beacon". In this variation, an LMU, upon receiving an "identification beacon" on one or more of its physical interfaces, will initiate protocol negotiation. This variation of the technique will then proceed as described above.

Downlink Antenna Receiver Subsystem

Use of the downlink receive antenna subsystem allows the LMU to detect and demodulate the beacon broadcasts from surrounding cells and sectors. In previous embodiments of a WLS, the downlink receive antenna subsystem was used to receive and demodulate the beacon of the resident cell and sectors. However, the beacons of non-resident cells and sectors in proximity to the LMU may be used to determine the CGI, BSIC, and frame timing offsets.

In the automated configuration process, the downlink receive antenna subsystem will be used not only to receive and demodulate the beacons of neighboring and geographically proximate cells and sectors, but also for TDOA location (i.e, downlink-TDOA) of each CGI detected by the LMU. For this, all detectable beacons are identified via CGI and the list of CGIs are uploaded to the SMLC. Under the direction of the SMLC, the WLS performs D-TDOA location calculations. These are optimally performed during WLS system idle time, although immediate or periodic scheduling is possible.

The produced table of CGI values and CGI locations can be used either to provision the SMLC or verify the accuracy of manually entered antenna site setting and location information. The produced table of CGI values and CGI locations can also be verified against GPS antenna locations provided by the GPS receiver subsystem's self-survey.

Periodic or ad hoc scanning of the detectable CGI's by the downlink receiver subsystem can be used to detect changes in the wireless communication system's configuration or additions of new beacons from the build-out of additional base stations or sectorization of an existing base station. Such canning can be configured to automatically occur during periods of low WLS/TLP usage.

The information on/in the beacon is shown in Tables 3 and 4 for GSM and UMTS, respectively. The GSM system uses the broadcast control channel (BCCH), a downlink (BTS to MS) channel, to convey the beacon function on a per CGI basis. The UMTS network uses the Broadcast Channel, a downlink UMTS transport channel that is used to broadcast cell and system information on a per CI basis.

TABLE 3

GSM Beacon Broadcast Information
GSM BCCH parameters

| | | | |
|---|---|---|---|
| National Color Code (NCC) | Broadcast Color Code (BCC) | MSTxPwr (Max Transmit Power) | Periodic network updates interval (T) |
| Cell Global Identifier (CGI) | Synchronisation code (SyncC) | | BCCH Code (BCCHC) |
| Access priority class (acsClas) | Mobile Country Code (MCC) | Mobile Network Code (MNC) | Location Area Code (LAC) |
| DTX Flag | Encryption Flag | Hopping Flag | |

TABLE 4

UMTS Beacon Broadcast Information
UMTS Broadcast Channel Parameters

| CBS Frame Offset | CTCH Allocation Period | Default DPCH Offset (DOFF) | ATT (IMSI Attach) Flag State | Cell Identity |
|---|---|---|---|---|
| Constant Value | DRX Cycle Length (CN Domain) | Local Area Code (LAC) | Mobile Country Code (MCC) | Mobile Network Code (MNC) |
| N313 UE Out-Of-Sync Counter | N315 UE In-Sync Counter | Network Mode of Operation | Routing Area Code (RAC) | Primary CPICH TX Power |
| PS Domain Information | T313 UE Link Reestablishment Timer | T3212 Periodic Location Update Timer | Uplink Interference | BCCH Update Page |
| RB Setup Timing Indication (CFN Handling) | | | | |

Similar beacon information is available for the IS-95 CDMA, CDMA2000 and the family of IEEE defined WiFi (802.11), WiMAN (802.16), and WiMAX (802.20) wireless communications systems.

The beacon discovery process will either occur periodically after installation or at the operator's discretion. The beacon discovery results are then checked at the SMLC against the stored historical information generated from site and system surveys. If a beacon is lost (originating cell is decommissioned) or a new beacon occurs (new cell site erected), the automated configuration process will be used with no or minimal operator intervention to reconfigure the WLS.

In order to provide locations, a WLS often needs detailed knowledge of the "wireless provider's network" (WPN) for which they are deployed. This detailed knowledge is supplied to the WLS in the form of extensive, typically manual, configuration data providing the physical and logical parameters that describe the WPN. This sizable data set should also be kept current with any modifications within the WPN that invalidate previous WLS configuration data. In typical environments, this manual process can be quite labor intensive, and error prone.

The technique described herein allows for a significant reduction in the amount of manual configuration and frequent synchronization of that data, which was previously required to keep a WLS "healthy". In particular, location techniques such as, but not limited to, U-TDOA need a precise mapping of cell identifiers (e.g. CGI in GSM networks) to cell tower (e.g. BTS in GSM networks) positions in order to be able to estimate the position of a wireless device which is accessing the WPN. The technique leverages the capabilities of the WLS to eliminate the error prone and manual configuration of cell identifiers (CID) to physical cell positions (PCP) or wireless access points (WAP).

Specifically, this can be accomplished by listening to and decoding the signaling emitted by the WAPs, which contain information about how a WAP is to be identified (CID) and accessed, locating the source of that signaling, and dynamically generating a map of WAPs to CIDs. Since the wireless network operator can reconfigure the network without making physical changes to the network, this periodic, scheduled or ad hoc scanning of the network can be used to detect these changes by changes in the broadcast signals.

For example, in a GSM network this signaling, typically referred to as a beacon, is delivered via a broadcast control channel (BCCH). Location Measurement Units capable of "hearing" the broadcasted beacons can be tasked to demodulate the RF and retrieve important information carried within the beacons. Of particular interest to this technique is the cell identifier (CGI) of the beacon origination point (the cell antenna which is broadcasting the beacon). Once the CGI has been decoded, the WLS can be tasked to locate the source of the beacon and compare the location result to an internal configuration of cell tower positions. Once a match is found, a table can be dynamically constructed which maps CGIs to cell tower positions. It should be noted, however, that these techniques are not restricted to GSM networks.

This technique can be employed for the following exemplary scenarios:

New Deployment:

In this scenario the need to statically configure the mapping of CIDs to WAPs is eliminated. The WLS will discover the CIDs in real-time, and will generate the mapping dynamically using the downlink receiver subsystem to perform a TDOA location for each beacon.

Newly Commissioned Base Station/Access Point Site:

New WAP sites will be discovered once they begin broadcasting their "beacon" and a downlink receiver scan is performed. Once the new beacon is discovered, a TDOA location is generated using LMUs in geographic proximity to the newly discovered beacon. Once a location is obtained, it and the network parameters and radio information obtained from the beacon are uploaded to the SMLC hosted database.

Decommissioned Site:

CID-to-WAP entries in the dynamically generated table can be removed when the signaling can no longer be detected, after a suitable waiting period. Operator notification and intervention will normally be required to differentiate a permanently decommissioned and a temporarily out-of-service site. In either case, the WLS can reconfigure its own database to avoid the missing site.

CID Re-Home:

Collisions within the detected to databased CID-to-WAP mapping can be indicative of CID re-homing. Re-homing refers to a remapping of a CID to the physical network and is indicative that a reconfiguration has been initiated by the wireless network operator. When such CID collisions are detected, map entries can be updated to reflect the CID re-homes. Additionally, periodic re-location of "beacons" will detect re-home scenarios that also involve decommissioning of a previous site. A re-home is especially destructive to the operations of the WLS since serving cell information (the CID) obtained from the network in the location request or via an autonomous trigger no longer matches the databased information. This mismatch can cause the WLS to incorrectly task the LMUs and can result in a low quality or no location.

SMLC Database and Sourced Configuration Data

Some configuration of the system will occur only after collected data from the LMU subsystems is processed by an operations and maintenance (OAM) subsystem of the SMLC. In the OAM subsystem, data collected from the LMU GPS subsystems and the LMU downlink antenna subsystems will be used to establish veracity between WNP-provided network and geographical information and collected and calculated network and geographical information.

The SMLC also stores, or is coupled to, a database of location records (e.g., the SMLC database 106). This database can be used to predict the quality-of-service for a location application based on the mobile device or network supplied cell-ID and proximity information (such as CGI+TA in GSM or CI+RTT in UMTS) prior to signal collection and/or location calculation. This same database can be used as described herein to hold the radio and network parameters generated by manual entry, downloading from the OSS, or developed from the GPS and/or downlink receiver subsystems.

As previously disclosed in U.S. patent application Ser. No. 11/534,137, filed Sep. 21, 2006, "Location Quality of Service Indicator," which is hereby incorporated by reference in its entirety, a location quality-of-service indicator, or QoSI, can be generated from historical location data. In the same manner, an evaluation of the required quality of service can be used with the historical data for the current cell or sector and used to select the optimal location technology from the available set. The optimal technology depends on the predicted location accuracy, availability, latency, precision, and/or yield that meets the required quality of service.

In some environments, multiple positioning methods may be required in order to achieve an acceptable quality of service; U-TDOA, e.g., performs better in certain environments than does AGPS, and visa versa. This is particularly true for a WLS that spans a large geographical area; although, geography is not the only component to consider, in fact, the time of day, location system health, and other factors can significantly contribute to the quality of service. In the most challenging of environments, it may not be possible, a priori, to determine what the best positioning method, for a given location, will be at any given time of day. This is even further complicated when other factors, such as weather and satellite visibility, must be considered.

In this type of environment, one approach would be to attempt multiple positioning methods simultaneously, and then select the best position, for that location, from the multiple results. While this approach would likely yield a better quality of service, it does so at the expense of system resources for the WLS, thereby reducing the overall capacity of the WLS and potentially degrading other location attempts due to competition for WLS system resources.

An alternative approach is to use historical data about the quality of performance of all location methods in a geographic area. The historical data could also include, but should not be limited to, information about the time of day, weather conditions, satellite visibility, serving cell information, availability of coops, and other temporal and spatial parameters that were present at the time the location was performed. In such a system, when newly deployed, the WLS would attempt multiple positioning methods at every location attempt, to both provide the best quality of service and to build up a database of location method performance. In effect, this collection of data is serving as training data for the system. Once trained, the WLS can select the historically most reliable positioning method based upon the parameters (such as, but not limited to, the approximate location and time of day) available at the time of the location request. In effect, an expert system can be applied to the available training data. This approach allows the system to conserve resources, and as such to provide the best quality of service not only for a single location attempt but for the WLS as a whole.

This technique could also be extended to select the optimal "positioning parameter set" for a given location method. For example, two factors that impact the quality of U-TDOA locations are the number of cooperators used (observation points) and the length of time the data is integrated. When performing U-TDOA locations, minor random variations in the U-TDOA parameters can be used, and a historical database (training data) can be built to determine what set of parameters worked best for a certain geography and time of day (as well as other parameters). Once again, this training data can be applied to an expert system so that the "best" positioning parameter set, for the best positioning method, which balances the consumption of system resources, can be employed. This supplementary technique can be applied to all positioning methods, and hybrid positioning methods.

Another example where this supplementary technique can be applied is when a WLS is employing the use of CML (combining multiple locations) of a single positioning method. For example, multiple, time sequenced, U-TDOA locations are performed for a single location request. This is typically done to account for multi-path, fading, and other environmental effects that could result in an $N^{th}$ location attempt having better results than the $1^{st}$ attempt. In this scenario, the historical data (training data) can predict how many locations, per location attempt, will result in the best performance while still conserving system resources, by applying the data to an expert system that will take parameters such as, but not limited to, approximate location and time of day into account.

Finally, techniques such as weighting and "memory loss" can be applied to the training data to avoid biases, as well as to account for changes in the environment. This could be done periodically or could be done when the predicted pattern does not match the actual outcome; for example, when a change in the environment invalidates the previous training data.

This SMLC hosted Location Server function can also be used by the WLS to select the correct location technique based on the historical data and the quality-of-service demanded for a specific location request. While some configuration data will be entered via the WLS's operations maintenance administration and provisioning (OAMP) component (the SCOUT™ tool), other information, such as cell site location, antenna locations, antenna downtilt, frequency bands, and radio channel configurations, may be obtained via the radio network operator's Operations Support System (OSS). Configuration data may be exported from the OSS, processed, and then imported into the SCOUT™ tool. All configuration data collected and processed is uploaded to the SMLC for use or for transmission to the SMLC's supported LMU population. Propagation models of the wireless communications network and geometric dilution of precision information for cooperating LMUs may be calculated by the SCOUT™ tool and uploaded to the SMLC for use or for transmission to the SMLC's supported LMU population.

Discovering New Beacons

Figure 4:
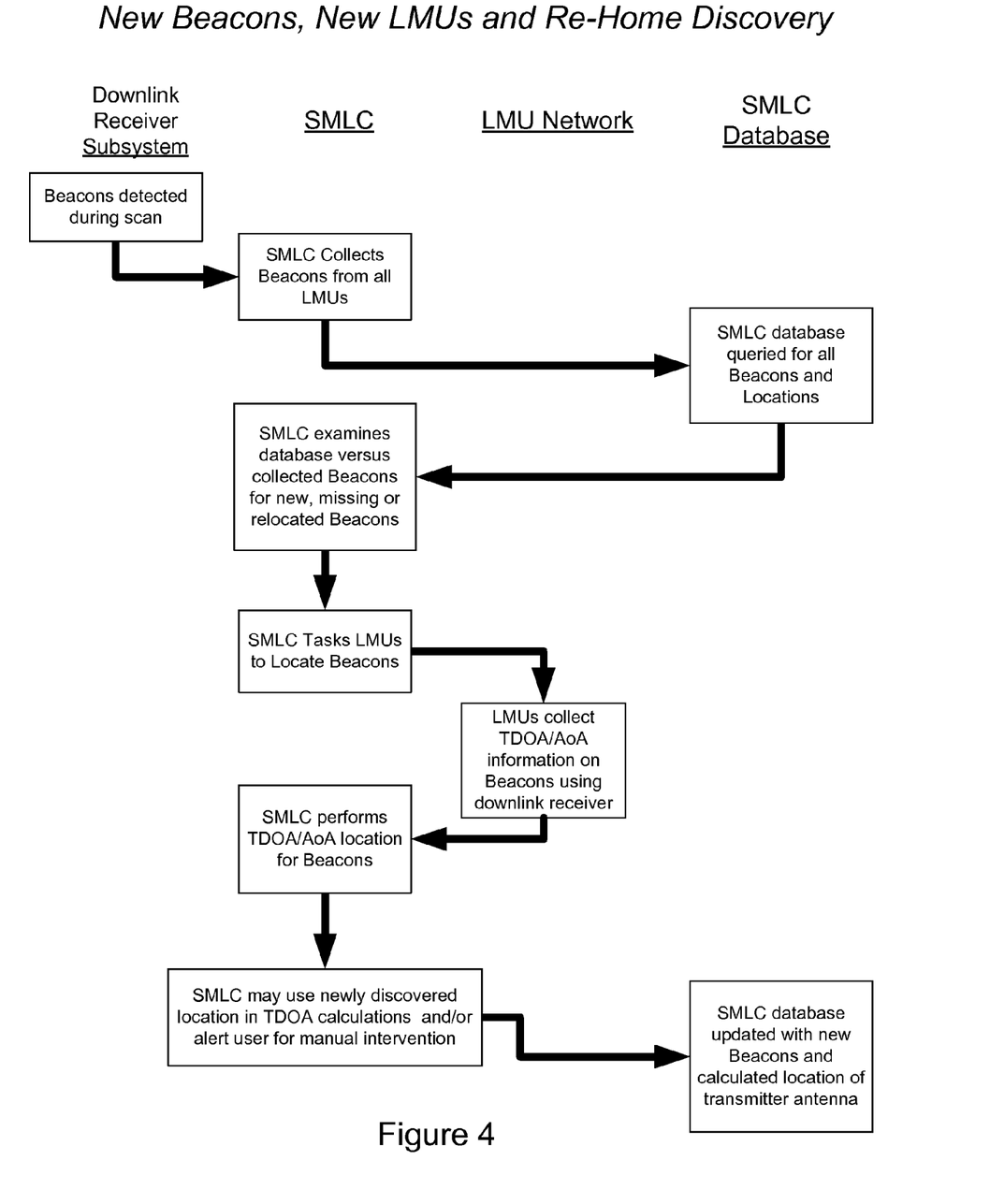
FIG. 4 illustrates a method for detecting and locating new beacons, new LMUs and wireless communications network reconfigurations.

FIG. 4 is a flowchart of a procedure employed by the WLS for discovering new beacons, which may be due to changes made by a wireless network provider to the wireless communications network (WCN). The procedure assumes either a scheduled, periodic or a manual ad hoc initiated scan of the WCN downlink broadcasts using the downlink receiver subsystem, including the downlink receiver, cabling and LMU software. The downlink receiver subsystem scans a prescribed range of frequencies to detect beacon signals. Once a beacon is found, it is demodulated to obtain broadcast site and antenna identifiers. The frequency, channel, and discovered network information is delivered to the SMLC. The SMLC examines the newly generated beacon information versus its databased information. Newly discovered beacons or mismatches between detected beacons' historical information generate a request from the SMLC to the LMUs in the proximity to the detecting LMU to perform a downlink TDOA signal collection on the beacon signal. Once the SMLC has received the beacon signal information and a location has been calculated, the SMLC can be configured either to alert the WLS operator or replace the mis-match location-to-beacon information in the SMLC database. In addition to discovering a new beacon or a change in an existing beacon, this procedure can be used to populate the beacon table for the new LMU or new SMLC.

GPS Self-Survey and Update

Figure 5:
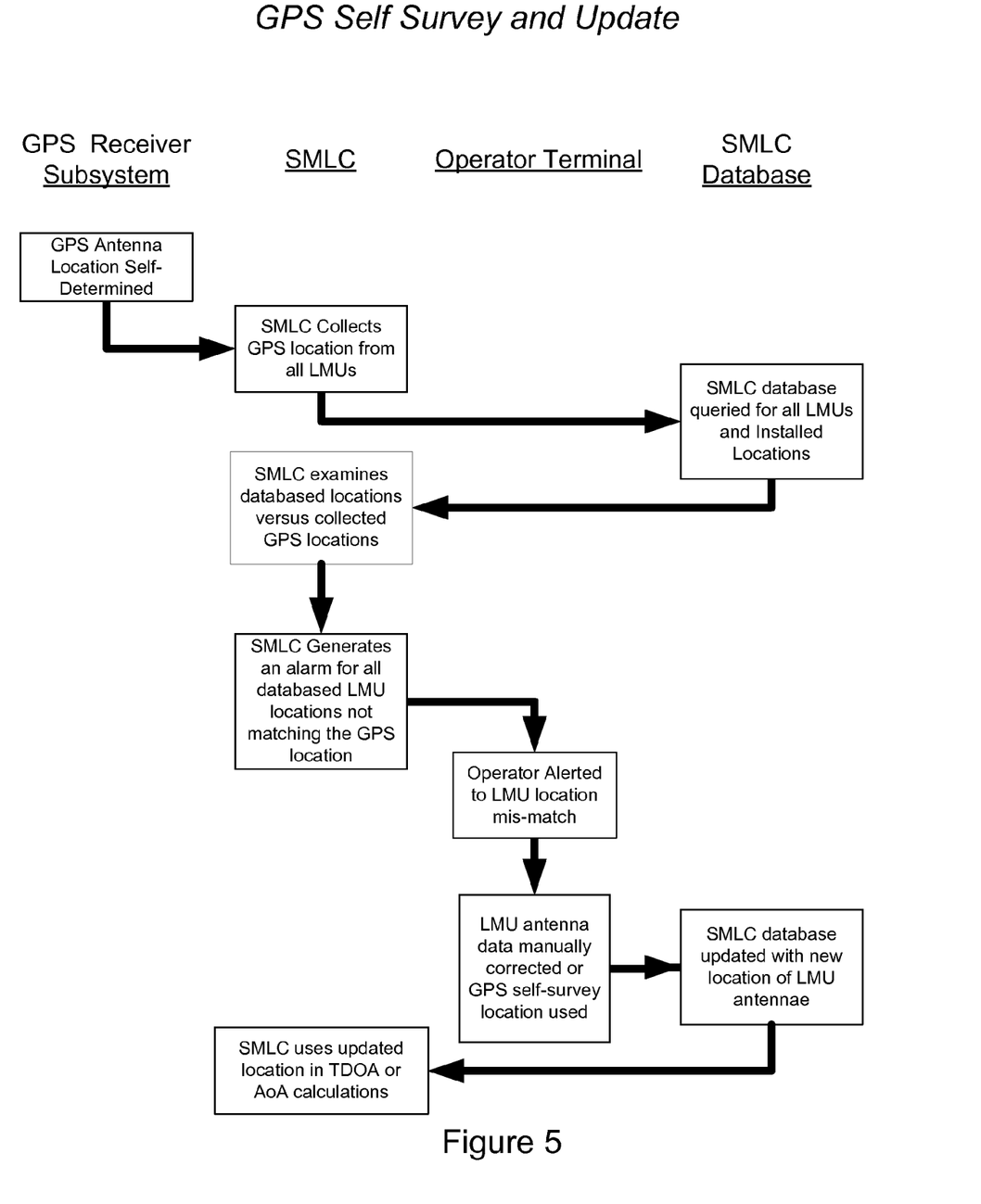
FIG. 5 illustrates a method for determining the validity of manually entered geographic information.

FIG. 5 is a flowchart of a procedure for GPS self-survey and update. A properly deployed GPS antenna will be able to detect and demodulate broadcasts from four or more satellites allowing the GPS receiver to supply the LMU with both a stable time reference and location of the GPS receiver. In the GPS self-survey procedure, each LMU generates its own GPS location (location of the GPS antenna), which is uploaded to the SMLC on a scheduled, periodic, or ad hoc basis. The SMLC compares the GPS-generated location of each LMU versus its databased, manually-entered data on the LMU location. If the GPS location versus the manually-entered location differ above a threshold (this threshold differs on a per market and BTS/BS/AP coverage size (macro, micro, pico)) value, then the SMLC alarms. The operator, upon receiving the alarm, can manually enter a new LMU uplink receiver antenna location and permanently override the alarm for that LMU or may elect to use the calculated GPS position for the LMU uplink receiver antenna location. Whatever the operator decision, the new value will be entered into the SMLC database and then used in future U-TDOA and/or AoA location calculations.

Co-Operator Selection

Figure 6A:
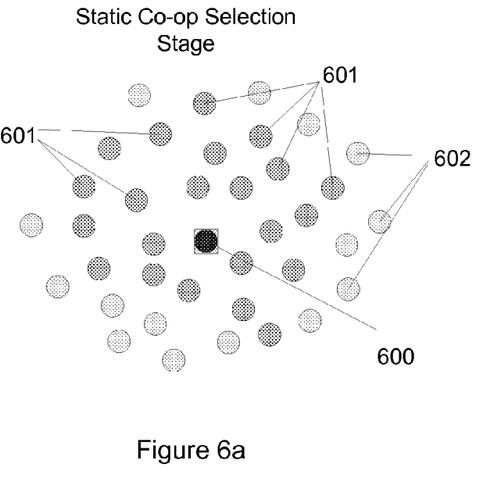
FIG. 6 is used to explain a method of static and dynamic cooperator selection and the improvement available when the methods described herein are implemented.
Figure 6B:
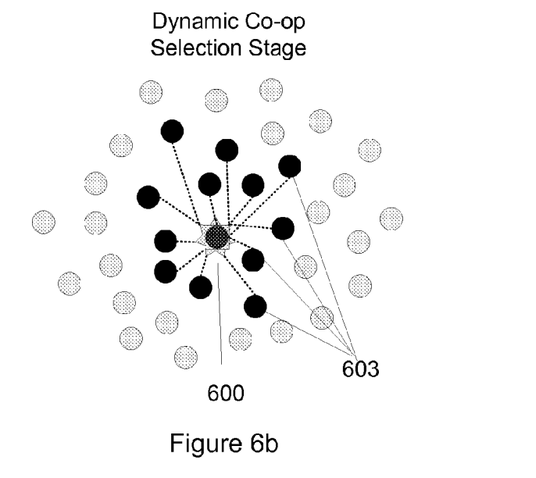

FIG. 6a depicts the first stage of a two-stage co-operator selection method. In the example of FIG. 6a, a location request to the WLS results in a population of LMUs 601 in geographic proximity to the LMU-equipped serving cell 600 being tasked to collect signal quality information. LMUs not within the programmed range or static neighbor set 602 are not polled. The collected signal quality information from the polled LMUs 601 is used in the dynamic co-operator selection stage shown in FIG. 6b, were a subset 603 of the original polled population of LMUs 601 are selected to provide timing information to the SMLC for location generation based on the collected signal quality data. Further information about such a method can be found in U.S. Pat. Nos. 6,483,460, Nov. 19, 2002, "Baseline Selection Method for Use in a Wireless Location System"; and 6,400,320B1, Jun. 4, 2006, "Antenna Selection Method for Use in a Wireless Location System".

Figure 6C:
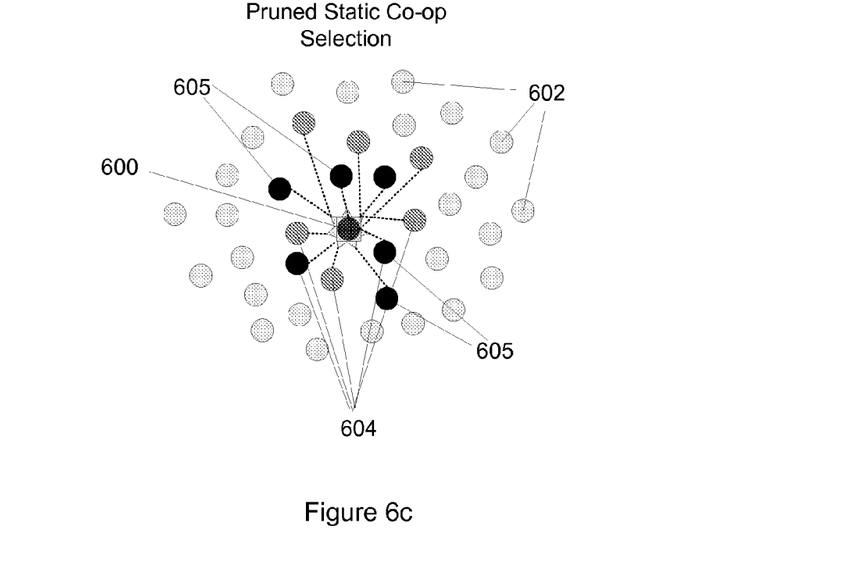

FIG. 6c depicts an improved 2-stage co-operator selection routine. The addition of a historical database for network and LMU information may also be used to store historical location quality and co-operator information. The initial stage 1 selection of LMU population is no longer static, but rather a subset of LMUs 604 is selected for the stage 1 signal quality collection based on the historical signal quality, location quality and the geometry (in an effort to reduce the geometric dilution of precision inherent in TDOA and AoA location) of the receiving LMUs. The new stage 1 LMU population can be much reduced or significantly different in geography and topology from the static set of polled LMUs used in the example of FIGS. 6a-b.

In FIG. 6c, sufficient historical information has been obtained to fully train the WLS. When the WLS is fully trained, the two LMU selection stages can be collapsed into a single stage. The result is that, when a location is requested for a mobile device served by a particular site or antenna, the SMLC can consult databased information to determine the correct subset of LMUs 604 to task for the signal quality collection stage, thus saving on processing and communications resources and raising the capacity of the WLS without degradation of the calculated location. In a fully trained system, the LMU population 604 that would have been part of the metrics collection is minimized so that it approximates the optimal LMU population 605 used in the location calculation. This operation also maximizes the number of unused LMUs 602, which are then available for tasking to other location requests.

SMLC Database and Historical Location Records

Figure 7:
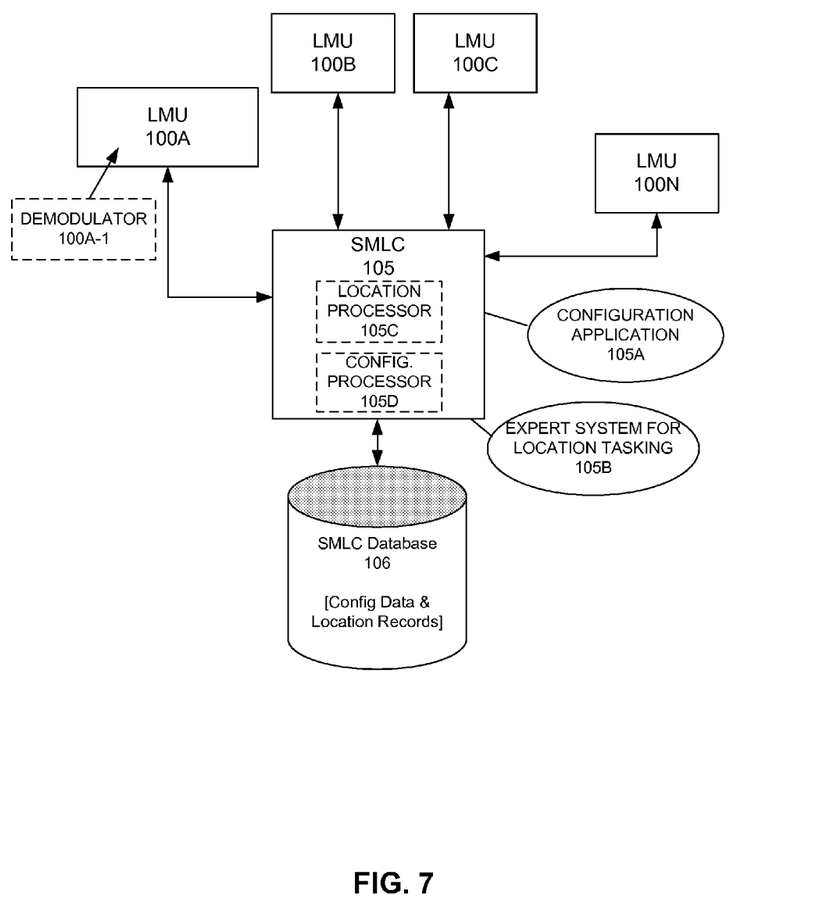
FIG. 7 provides a block diagrammatic view of a WLS in which configuration data and historical location records are maintained in a central, interactive database.

FIG. 7 provides a block diagrammatic view of a WLS in which configuration data and historical location records are maintained in a central, interactive database. As shown, the WLS comprises a network of LMUs 100A (including demodulator 100A-1), 100B, 100C . . . 100N; an SMLC 105 operatively coupled to the network of LMUs, the SMLC including a programmable processor (shown as including a location processor 105C and a configuration processor 105D); and an SMLC database 106 containing location records and configuration data concerning a plurality of BTSs of a wireless communications system. In addition, as indicated in FIG. 7, the SMLC 105 may include a configuration application (software) 105A and an expert system for location tasking 105B. In this example, the SMLC processor is configured, via the expert system application 105B, to record LMU use during a location event for mobile stations in a specific cell or sector and then to use only those LMUs that produced useful information in subsequent locations for mobile stations within that specific cell or sector. Moreover, the SMLC processor is further configured to record a historical database of results from location calculations involving multiple location technologies for MSs within a specific cell or sector, and then to use the historical database to select the technology or combination of technologies that best suits a requested quality of service for future location requests for MSs within that specific cell or sector.

As described hereinabove, the location records contained in the SMLC database may include information concerning the following facts relating to previous location events: serving cell, cooperators used, technology used, calculated uncertainty, time of day, weather, satellite visibility, serving cell, and availability of cooperators. In addition, the configuration data contained in the SMLC database may include information concerning the following facts relating to the WLS configuration: cell site identifiers, broadcast channels, radio frequencies, antenna identifiers, antenna locations, site location, and LMU identifiers.

CONCLUSION

The true scope the present invention is not limited to the presently preferred embodiments disclosed herein. For example, the foregoing disclosure of a presently preferred embodiment of a Wireless Location System uses explanatory terms, such as Location Measurement Unit (LMU), Serving Mobile Location Center (SMLC), and the like, which should not be construed so as to limit the scope of protection of the following claims, or to otherwise imply that the inventive aspects of the Wireless Location System are limited to the particular methods and apparatus disclosed. Moreover, as will be understood by those skilled in the art, many of the inventive aspects disclosed herein may be applied in location systems that are not based on TDOA techniques. For example, the invention is not limited to systems employing LMUs constructed and deployed as described above. The LMUs and SMLC, etc. are, in essence, programmable data collection and processing devices that could take a variety of forms without departing from the inventive concepts disclosed herein. Given the rapidly declining cost of digital signal processing and other processing functions, it is easily possible, for example, to transfer the processing for a particular function from one of the functional elements (such as the LMU) described herein to another functional element within the wireless communications network (such as the BTS or base station) without changing the inventive operation of the system. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

We claim:

1. A method for use in providing configuration data in a network-based wireless location system (WLS) associated with a wireless communications system, wherein said WLS includes a plurality of location measurement units (LMUs) at least some of which are co-located with a respective base transceiver station (BTS) of the wireless communications system and include a downlink receiver subsystem to enable discovery of a new downlink beacon and a new BTS, comprising:
    using a downlink receiver subsystem of a first LMU associated with the WLS, discovering a first beacon transmitted on a downlink channel by a first BTS, wherein said first beacon carries at least an identification code associated with said first BTS and wherein discovering the first beacon comprises determining that the identification code carried by said first beacon is not within a serving mobile location center (SMLC) database, thereby indicating that the first beacon is new;
    using said WLS, determining the geographic location of said first BTS; and
    storing in said SMLC database configuration data indicative of the identification and geographic location of said first BTS;
    wherein the wireless communications system comprises one of a GSM network and a UMTS network, and wherein the downlink channel comprises one of a Broadcast Control Channel (BCCH) and a Broadcast Channel; and
    wherein said first beacon includes at least one of an Access Point Identifier (AP-ID), a Cell Global Identifier (CGI), a Cell/Sector Identifier (cell/sector ID), or a Cell Identifier (CID).

2. A method as recited in claim 1, wherein the step of determining the geographic location of said first BTS includes the use of a time difference of arrival (TDOA) computation made by the WLS.

3. A method as recited in claim 1, wherein said first LMU further includes a GPS receiver subsystem, and wherein the method further comprises using said GPS receiver subsystem to determine the geographic location of at least the first LMU or a GPS receive antenna employed by the first LMU, and storing data indicative of said location in said SMLC database.

4. A method as recited in claim 3, wherein said GPS receiver subsystem is operative during a holdover period to provide timing signals to said first LMU while the GPS receiver subsystem is determining the geographic location of the first LMU or GPS receive antenna.

5. A method as recited in claim 1, further comprising:
    using said downlink receiver subsystem to detect a second beacon transmitted on a downlink channel by a second BTS, wherein said second beacon carries at least an identification code associated with said second BTS;
    determining the geographic location of said second BTS;
    detecting a mismatch between the geographic location of said second BTS and location data associated with said second BTS in said SMLC database; and
    generating a signal to indicate that a mismatch has been detected.

6. A method as recited in claim 1, further comprising producing an internal mapping of BTS identifiers to pre-configured locations.

7. A method as recited in claim 1, further comprising producing a mapping of sector or antennae identifiers to pre-configured locations.

8. A method as recited in claim 1, further comprising:
    using said downlink receiver subsystem to detect a second beacon transmitted on a downlink channel by a second BTS, wherein said second beacon carries at least an identification code associated with said second BTS;
    determining the geographic location of said second BTS;
    detecting a re-homing of said second BTS based on a mismatch between the geographic location of said second BTS and data associated with said second BTS in said SMLC database; and
    generating a signal to indicate that a re-homing has been detected.

9. A system for use in automatically providing configuration data in a wireless location system (WLS) comprising a network of location measurement units (LMUs) and a serving mobile location center (SMLC) database containing configuration data concerning a plurality of base transceiver stations (BTSs) of a wireless communications system, comprising:
    a first LMU comprising a downlink receiver subsystem and configured to discover a first beacon transmitted on a downlink channel by a first BTS, wherein said first beacon carries at least an identification code associated with said first BTS, and wherein discovering the first beacon comprises determining that the identification code carried by said first beacon is not within the SMLC database, thereby indicating that the first beacon is new; and
    a location processor configured to determine the geographic location of said first BTS using a time difference of arrival (TDOA) computation and signals received by said first LMU and a plurality of additional LMUs capable of receiving said first beacon;
    wherein the wireless communications system comprises one of a GSM network and a UMTS network, and wherein the downlink channel comprises one of a Broadcast Control Channel (BCCH) and a Broadcast Channel; and
    wherein said first beacon includes at least one of an Access Point Identifier (AP-ID), Cell Global Identifier (CGI), Cell/Sector Identifier (cell/sector ID), or Cell Identifier (CID).

10. A system as recited in claim 9, wherein said first LMU includes a GPS receiver subsystem, and wherein the system is configured to use said GPS receiver subsystem to determine the geographic location of at least the first LMU or a GPS receive antenna employed by the LMU, and to store data indicative of said location in said SMLC database.

11. A system as recited in claim 10, wherein said GPS receiver subsystem is operative during a holdover period to provide timing signals to said first LMU while the GPS receiver subsystem is determining the geographic location of the first LMU or receive antenna.

12. A system as recited in claim 9, further comprising means for detecting the decommissioning of a BTS.

13. A system as recited in claim 9, further comprising means for detecting the re-homing of said first BTS.

14. A wireless location system (WLS), comprising:
a network of location measurement units (LMUs);
a serving mobile location center (SMLC) operatively coupled to said network of LMUs, said SMLC comprising a programmable processor; and
an SMLC database operatively coupled to said SMLC, said database containing location records and configuration data concerning a plurality of base transceiver stations (BTSs) of a wireless communications system;
wherein each of at least first, second, and third LMUs in said network of LMUs comprises a downlink receiver subsystem and the WLS is configured to discover a first beacon transmitted on a downlink channel by a first BTS of a wireless communications system, wherein discovering the first beacon comprises determining that an identification code carried by said first beacon is not within the SMLC database, thereby indicating that the first beacon is new;
wherein said first LMU is co-located with a BTS of the wireless communications system and is connected to an antenna of the wireless communications system by radio frequency grade cabling;
wherein the wireless communications system comprises one of a GSM network and a UMTS network; and
wherein said identification code comprises at least one of an Access Point Identifier (AP-ID), Cell Global Identifier (CGI), Cell/Sector Identifier (cell/sector ID), or Cell Identifier (CID), and wherein the downlink channel comprises at least one of a broadcast control channel (BCCH) and a Broadcast Channel.

15. A WLS as recited in claim 14, wherein the SMLC processor is configured to record LMU use during a location event for mobile stations (MSs) in a specific cell or sector and then to use only those LMUs that produced useful information in subsequent locations for mobile stations within that specific cell or sector.

16. A WLS as recited in claim 14, wherein the SMLC processor is configured to record a historical database of results from location calculations involving multiple location technologies for mobile stations (MSs) within a specific cell or sector, and then to use the historical database to select the technology or combination of technologies that best suits a requested quality of service for future location requests for MSs within that specific cell or sector.

17. A WLS as recited in claim 14, further comprising a demodulator configured to demodulate said identification code carried by said first beacon.

18. A WLS as recited in claim 17, wherein the SMLC processor is configured to determine the geographic location of said first BTS using a time difference of arrival (TDOA) computation and signals received by said first, second and third LMUs.

19. A WLS as recited in claim 18, wherein said SMLC processor is further configured to detect at least one change in the wireless communication system's configuration and to update configuration data in said SMLC database accordingly.

20. A WLS as recited in claim 19, wherein the at least one change detected comprises the decommissioning of a BTS.

21. A WLS as recited in claim 19, wherein the at least one change detected comprises the re-homing of said first BTS.

22. A WLS as recited in claim 14, wherein said first LMU includes a GPS receiver subsystem, and wherein the WLS is configured to use said GPS receiver subsystem to determine the geographic location of at least the first LMU or a GPS receive antenna employed by the LMU, and to store data indicative of said location in said SMLC database.

23. A method as recited in claim 22, wherein said GPS receiver subsystem is operative during a holdover period to provide timing signals to said first LMU while the GPS receiver subsystem is determining the geographic location of the first LMU or receive antenna.

24. A WLS as recited in claim 14, wherein the location records contained in said SMLC database include information concerning the following facts relating to previous location events: serving cell, cooperators used, technology used, calculated uncertainty, time of day, weather, satellite visibility, serving cell, and availability of cooperators.

25. A WLS as recited in claim 14, wherein the configuration data contained in said SMLC database includes information concerning the following facts relating to the WLS configuration: cell site identifiers, broadcast channels, radio frequencies, antenna identifiers, antenna locations, site location, and LMU identifiers.

* * * * *